June 12, 1962 D. J. BLUNDEN 3,038,740
VEHICLE TIE-DOWN STRUCTURE
Filed Oct. 3, 1960 4 Sheets-Sheet 1
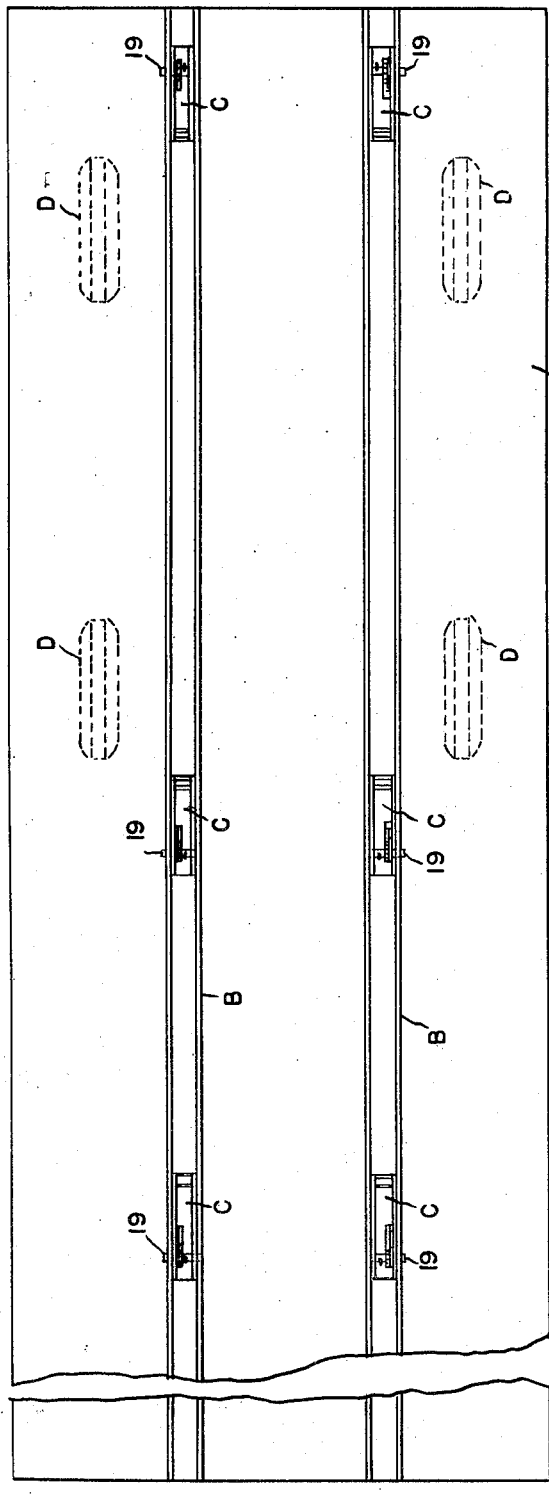
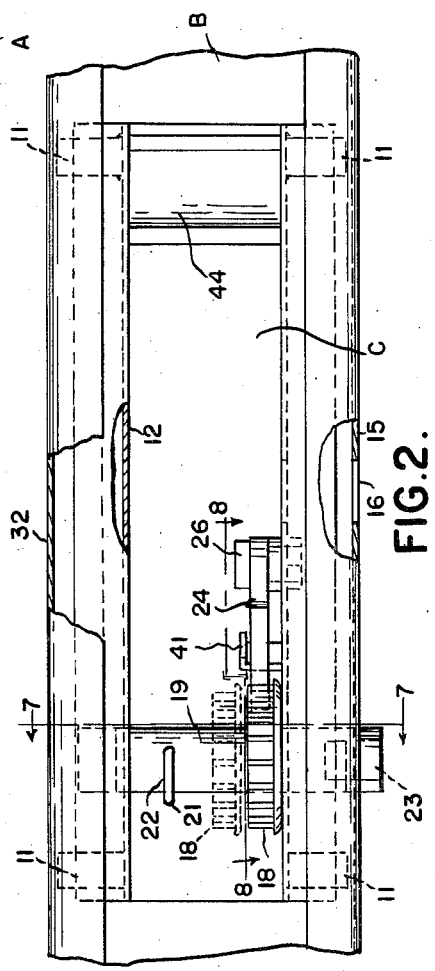
INVENTOR.
DONALD J. BLUNDEN
BY
ATTORNEYS June 12, 1962 — D. J. BLUNDEN — 3,038,740
VEHICLE TIE-DOWN STRUCTURE
Filed Oct. 3, 1960 — 4 Sheets-Sheet 2
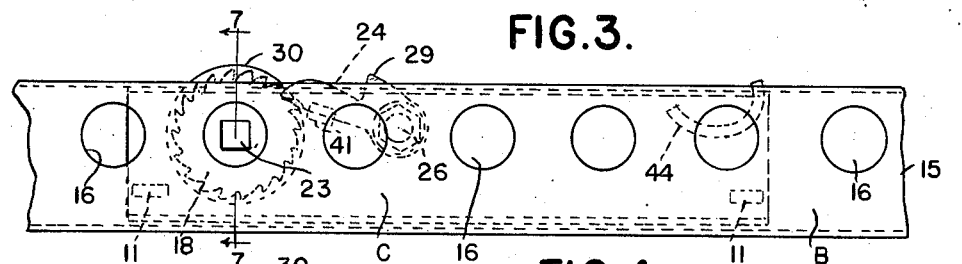
FIG.3.
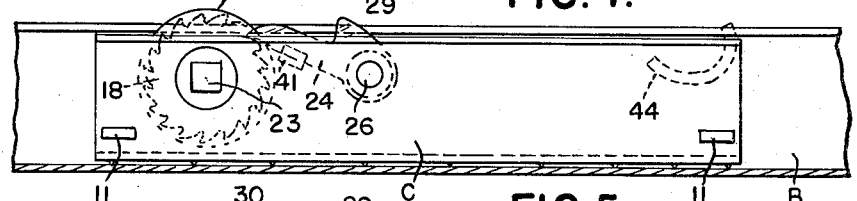
FIG.4.
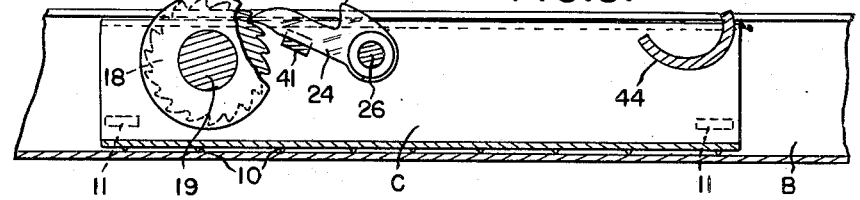
FIG.5.
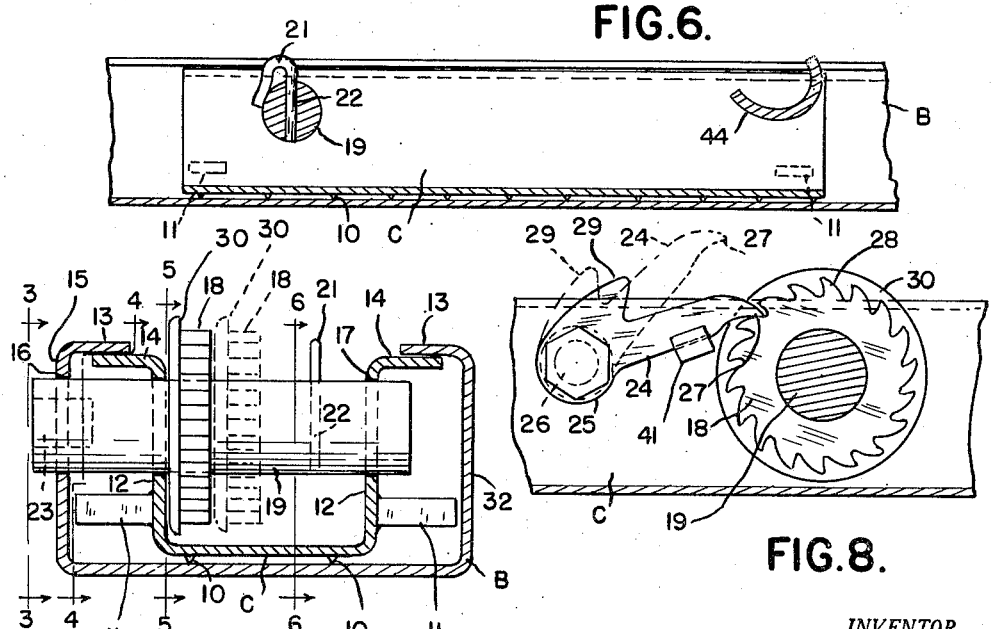
FIG.6.
FIG.7.
FIG.8.
INVENTOR.
DONALD J. BLUNDEN
BY
Whittemore, Hulbert & Belknap
ATTORNEYS

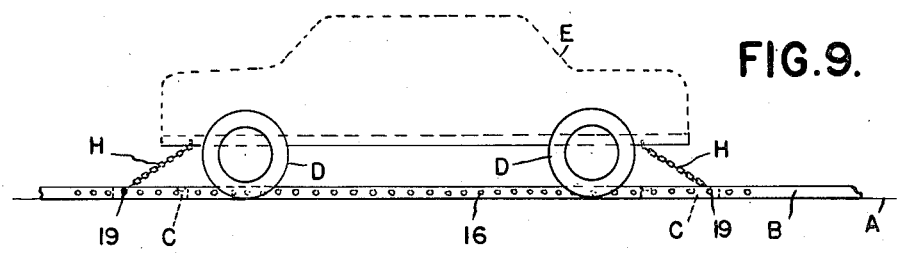
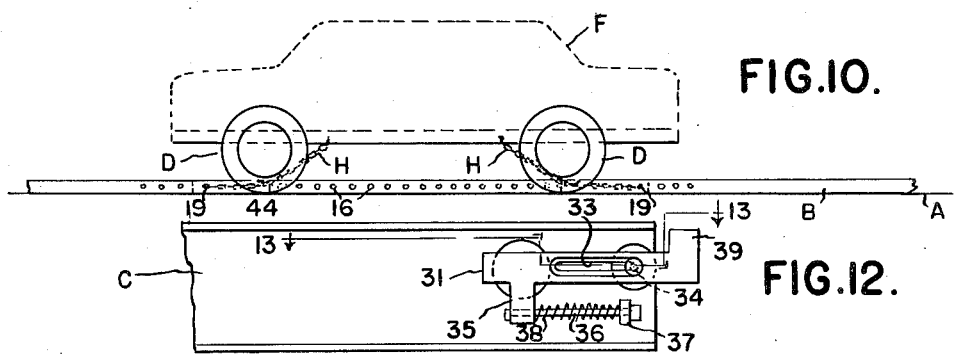
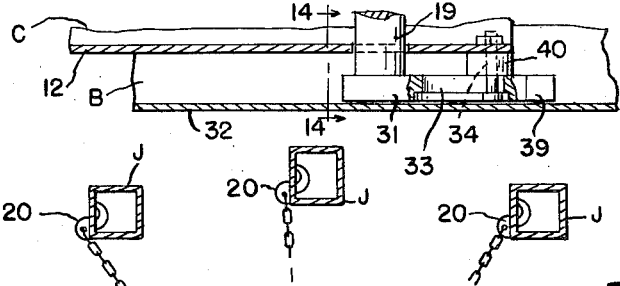
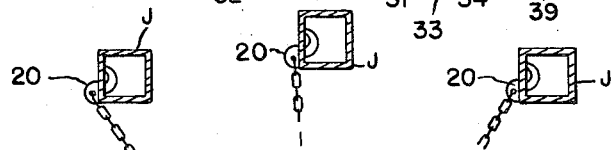
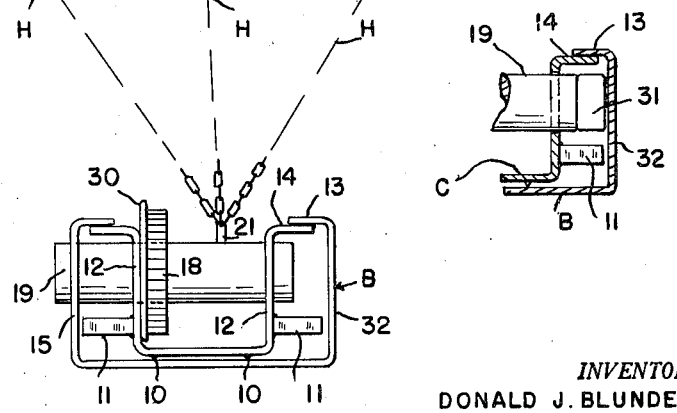

June 12, 1962  D. J. BLUNDEN  3,038,740

VEHICLE TIE-DOWN STRUCTURE

Filed Oct. 3, 1960  4 Sheets-Sheet 4

INVENTOR.
DONALD J. BLUNDEN
BY
Whittemore, Hulbert & Belknap
ATTORNEYS

United States Patent Office 3,038,740
Patented June 12, 1962

3,038,740
VEHICLE TIE-DOWN STRUCTURE
Donald J. Blunden, Detroit, Mich., assignor to Whitehead & Kales Company, River Rouge, Mich., a corporation of Michigan
Filed Oct. 3, 1960, Ser. No. 59,927
19 Claims. (Cl. 280—179)

This invention relates generally to tie-down structures for motor vehicles, and refers more particularly to structures of the type mentioned that are operable to tie down and hold motor vehicles against displacement while they are supported in tandem upon one or more longitudinally extending elongated decks or the like of a transport vehicle.

One of the essential objects of the invention is to provide a transport vehicle with a tie-down structure capable of universal use with motor vehicles of various sizes, i.e. motor vehicles having different lengths and/or widths, so that when such motor vehicles are arranged in tandem upon a supporting deck of a transport vehicle, the tie-down structure embodying my invention may be readily applied to said motor vehicles regardless of the size thereof and will effectively hold them against displacement.

Another object is to provide a tie-down structure that includes two laterally spaced substantially parallel stationary main channels or rails that extend throughout substantially the entire length of each supporting deck for the motor vehicles and that contain at longitudinally spaced points thereof relatively short channels or carriages that are individually adjustable longitudinally of the main channels and that in turn contain the mechanism by which the motor vehicles may be tied down and held against displacement.

Other objects are to provide a tie-down structure: wherein four longitudinally adjustable channels of the type mentioned are provided for each motor vehicle and are arranged in transversely aligned pairs at longitudinally spaced points of said main channels; wherein the parallel main channels mentioned are rigidly secured to and serve effectively as reinforcements for the supporting deck to prevent such deck from bending or buckling under the load of the motor vehicles in tandem thereon; wherein the parallel main channels mentioned serve as guides for the motor vehicles while they are being loaded onto or unloaded from the supporting deck; wherein each adjustable channel is provided with means operable during adjustment thereof lengthwise of its supporting main channel to guide the adjustable channel during movement thereof lengthwise of such main channel; wherein each main channel is provided at longitudinally spaced points thereof with openings, and each tie-down mechanism contained within each adjustable channel includes a ratchet gear fixed to a longitudinally movable supporting stub shaft that is adjustable transversely of the adjustable channel through an opening therein into engagement with one of the longitudinally spaced openings aforesaid in its supporting main channel to detachably lock such adjustable channel in place after the latter has been adjusted lengthwise of the main channel; and wherein a flexible tie-down chain, cable or the like is secured at one end to each stub shaft and is provided at its free end with suitable means such as a hook by which said chain may be detachably connected to the frame or other suitable part of a motor vehicle to be tied down.

Other objects are to provide a tie-down structure: wherein the stub shaft is provided at one end thereof with an axially extending outwardly opening polygonal socket for the reception of a correspondingly shaped end of an operating crank by which it may be rotated to cause the tie-down chain to be wound upon said stub shaft and thereby tensioned or tightened when it is desired to tie down a motor vehicle; wherein the tie-down mechanism contained within each adjustable channel also includes a manually operable pawl pivotally mounted on each adjustable channel and engageable with one of the teeth of an adjacent ratchet gear to hold the latter and its supporting shaft against rotation when the tie-down chain mentioned has been tightened; wherein the main channels and the adjustable channels are provided with cooperating means to prevent upward displacement of the adjustable channels from their supporting main channels when the tie-down chains mentioned are tightened to tie down the motor vehicles; wherein means is provided to hold the adjustable supporting stub shaft for each ratchet gear in an adjusted locked position within one of the longitudinally spaced openings in a main channel to thereby prevent any accidental displacement thereof; wherein means is provided on each adjustable channel for locking each pawl in operative position relative to the ratchet gear to thereby prevent such pawl from becoming accidentally disengaged from said ratchet gear; wherein means carried by each adjustable channel is operable as a brace against the inner side of each pawl to hold such pawl in operative engagement with one of the teeth of an adjacent ratchet gear and to prevent the pawl from bending or breaking when it is subjected to transverse thrust by the radially extending flange on the ratchet gear due to a pull imparted thereto by the flexible chain connected to the supporting stub shaft for said ratchet gear; and wherein the means just mentioned is also operable as a supporting shelf for each pawl to keep the same from falling to an inaccessible position upon the bottom of the adjustable channel after the stub shaft for each ratchet gear has been retracted or adjusted inwardly and thereby has been disengaged from one of the longitudinally spaced openings in the adjacent main channel.

Another object is to provide a tie-down structure that is simple in construction, economical to manufacture, and efficient in operation.

Other objects, advantages and novel details of construction of this invention will be made more apparent as this description proceeds, especially when considered in connection with the accompanying drawings, wherein:

FIGURE 1 is a fragmentary top plan view of a longitudinally extending elongated deck of a transport vehicle equipped with a tie-down structure embodying my invention, and showing by dotted lines the positions of four ground-engaging wheels of one motor vehicle supported upon said deck.

FIGURE 2 is an enlarged fragmentary top plan view of a tie-down structure embodying my invention, with parts broken away and in section.

FIGURE 3 is a vertical sectional view taken substantially on the line 3—3 of FIGURE 7.

FIGURE 4 is a vertical sectional view taken substantially on the line 4—4 of FIGURE 7.

FIGURE 5 is a vertical sectional view taken substantially on the line 5—5 of FIGURE 7.

FIGURE 6 is a vertical sectional view taken substantially on the line 6—6 of FIGURE 7.

FIGURE 7 is a vertical sectional view taken substantially on the line 7—7 of FIGURE 2.

FIGURE 8 is a vertical sectional view taken substantially on the line 8—8 of FIGURE 2.

FIGURE 9 is a fragmentary elevational view of the deck equipped with a tie-down structure embodying my invention, and showing the chains of the tie-down mechanism attached to a motor vehicle supported upon said deck.

FIGURE 10 is very similar to FIGURE 9 but showing the chains of the tie-down mechanism extended beneath the shoes and attached to a motor vehicle.

FIGURE 11 is an enlarged cross-sectional view through a tie-down structure embodying my invention and showing three alternative positions of a tie-down chain when the latter is connected to frame members of three motor vehicles of different widths.

FIGURE 12 is a fragmentary elevational view of a slightly modified structure.

FIGURE 13 is a horizontal sectional view taken substantially on the line 13—13 of FIGURE 12.

FIGURE 14 is a vertical sectional view taken substantially on the line 14—14 of FIGURE 13.

FIGURE 17 is a vertical sectional view taken substantially on the line 18—18 of FIGURE 16.

Figure 15:
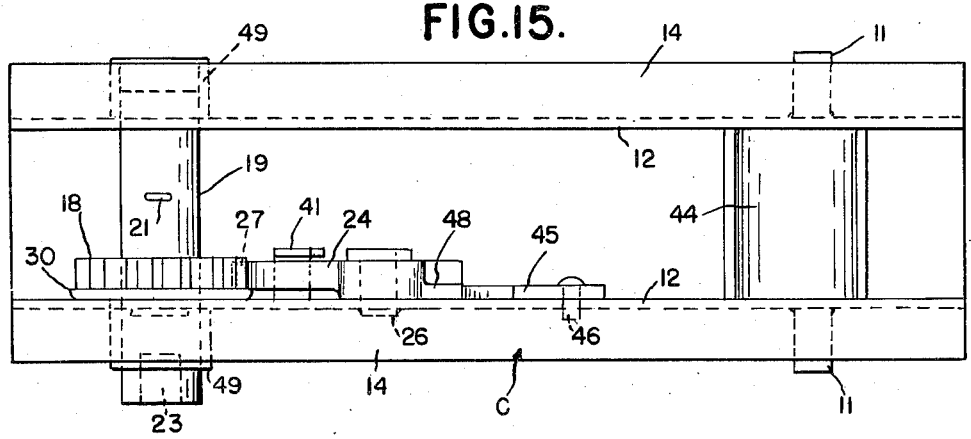
FIGURE 15 is a top plan view of one of the adjustable channels equipped with a slightly modified tie-down structure.

In the drawings, A is an elongated substantially flat deck of a transport vehicle for motor vehicles, B are stationary main channels or rails disposed in laterally spaced substantially parallel relation to each other and extending throughout substantially the entire length of said deck, and C are relatively short channels or carriages that are within the main channels B at longitudinally spaced points thereof and are individually adjustable longitudinally of said main channels.

Preferably the area of the deck A is such that it is capable of supporting thereon in tandem several motor vehicles of various sizes, i.e. motor vehicles having different lengths and/or widths. In the present instance, I have shown in FIGURE 1 an outline of the four ground-engaging wheels D of one of the motor vehicles mentioned, and have shown in FIGURES 9 and 10 respectively outlines E and F respectively of two other motor vehicles. However, the tie-down structure embodying my invention may be readily applied to such motor vehicles regardless of the size thereof.

The parallel main channels B are rigidly secured to and serve effectively as reinforcements for the supporting deck A to prevent such deck from bending or buckling under the load of the motor vehicles in tandem thereon. Such main channels B also serve as guides for the motor vehicles while they are being loaded onto or unloaded from the supporting deck.

The short adjustable channels or carriages C are slidable lengthwise of and are supported by the main channels B. Preferably four adjustable channels C are provided for each motor vehicle and are arranged in transversely aligned pairs at longitudinally spaced points of the main channels B. Each adjustable channel C is provided with means such as skids 10 and lugs 11 that are operable to guide each adjustable channel C during movement thereof, lengthwise of its supporting main channel B. As shown, the skids 10 are rigid with and are spaced laterally apart from the underside of each adjustable channel C, and the lugs 11 are rigid with and project laterally from opposite side walls 12 of the adjustable channel at longitudinally spaced points thereof.

The main and adjustable channels B and C respectively have cooperating means in the form of overlapping flanges 13 and 14 respectively to prevent upward displacement of the adjustable channels C from their supporting main channels B when the tie-down chains H are tightened to tie down the motor vehicles.

The outer side wall 15 of each main channel B is provided at longitudinally spaced points thereof with openings 16, and each adjustable channel C is provided in opposite side walls 12 thereof with transversely aligned holes 17 that are adapted to register with one of the longitudinally spaced openings 16 aforesaid in a supporting main channel.

The adjustable channels C carry the mechanism by which the motor vehicles may be tied down and held against displacement. Each mechanism includes a ratchet gear 18 fixed to a supporting stub shaft 19 that is adjustable transversely of each adjustable channel C into engagement with one of the longitudinally spaced openings 16 aforesaid in a supporting main channel B to detachably lock such adjustable channel C in place after the latter has been adjusted lengthwise of the main channel.

The tie-down flexible chain, cable, or the like H is secured at one end to each stub shaft 19 and is provided at its free end with a hook 20 by which said chain H may be detachably connected to the frame J or other suitable part of a motor vehicle to be tied down. Preferably, the tie-down chain H is secured to an eye 21 of a hook 22 terminally secured to the stub shaft 19, as shown in FIGURE 6 of the drawings.

The stub shaft 19 is mounted for both sliding and rotary movements in the aligned holes 17 in the adjustable channel C. The ratchet gear 18 may be used as a finger piece to slide the stub shaft 19 transversely of the adjustable channel. The stub shaft 19 is provided at the outer end thereof with an axially extending outwardly opening polygonal socket 23 for the reception of a correspondingly shaped end portion of an operating crank (not shown) by which it may be rotated to cause the tie-down chain H to be wound upon said stub shaft 19 and thereby tensioned or tightened when it is desired to tie down a motor vehicle.

A manually operable pawl 24 is provided at one end with a hub 25 pivotally mounted upon a headed pivot pin or rivet 26 carried by the outer side wall 12 of each adjustable channel C in longitudinally spaced relation to the ratchet gear 18, and has a free end portion 27 that is engageable with one of the teeth 28 of such ratchet gear 18 to hold the latter and its supporting stub shaft 19 against rotation when the tie-down chain H has been tightened. Preferably, the hub 25 of this pawl 24 is provided with a radially extending arm or finger piece 29 by which said pawl 24 may be manipulated about its pivot pin 26.

Either of two means may be employed to hold the adjustable supporting stub shaft 19 for each ratchet gear 18 in an adjusted locked position within one of the longitudinally spaced openings 16 in a main channel B to thereby prevent any accidental displacement thereof.

One of the two means mentioned comprises an integral circular radially extending rim or flange 30 that is provided upon the outer side of the ratchet gear 18 for abutting engagement with the adjacent outer side wall 12 of the adjustable channel C and that is adapted to be engaged by the outer side of the pawl 24 when the latter is in engagement with one of the teeth 28 of the ratchet gear. Preferably, the ratchet gear 18 and flange 30 are formed as a one-piece casting.

The other of the two means mentioned comprises a plunger 31 slidably mounted upon the outer side of the inner side wall 12 of each adjustable channel C and engageable with the inner end of an adjacent stub shaft 19. The thickness of this plunger 31 is preferably substantially equal to the space between the adjacent inner side wall 32 of the main channel B and the inner end of an adjacent stub shaft 19 when the latter is in its outermost locked position within one of the longitudinally spaced openings 16 in the outer side wall 15 of the main channel. Thus, the plunger 31 will serve as a filler for the space between the inner side wall 32 of the main channel B and the adjacent end of the stub shaft 19 and will effectively prevent any accidental endwise movement of the stub shaft 19 from a selected opening 16 in an outer side wall 15 of the main channel B toward the inner side wall 32 thereof.

Preferably, the plunger 31 has a longitudinally extending horizontal slot 33 receiving a pin 34 rigid with and projecting laterally from the inner side wall 12 of the adjustable channel C, and has in longitudinally spaced relation to said slot 33 a depending arm 35 that is slidably mounted on a longitudinally extending horizontal rod 36 carried by a lug 37 rigid with and projecting laterally from the inner side wall 12 of the adjustable channel C. A coil spring 38 is sleeved on the rod 36 between the lug 37 and arm 35 and urges the plunger 31 into the path of the stub shaft 19, while an upstanding finger piece or handle 39 by which the plunger 31 may be manipulated is integral therewith at a point beyond an adjacent end of the adjustable channel C.

By pulling on the handle 39, the plunger 31 may be retracted against the tension of the spring 38 to cause the plunger 31 to be withdrawn from engagement with the adjacent end of a stub shaft 19 when it is desired to retract the latter from a selected opening 16 in an adjacent main channel B and thereby permit the adjustable channel C to be slid lengthwise of its supporting main channel B from one position to another. When this means is used, the rim or flange 30 aforesaid on the ratchet gear 18 may be omitted if desired. A spacer 40 is sleeved on the pin 34 between the inner side wall 12 of the adjustable channel C and the plunger 31 to properly align said plunger 31 with the space mentioned between the inner side wall 32 of the main channel B and the inner end of an adjacent stub shaft 19.

A substantially L-shaped bracket 41 carried by each adjustable channel C is operable as a brace against the inner side of each pawl 24 to hold such pawl in operative engagement with one of the teeth of an adjacent ratchet gear 18 and to prevent such pawl from bending or breaking, and is operable as a supporting shelf for the pawl to keep such pawl from falling to an inaccessible position upon the bottom of the adjustable channel C after the stub shaft 19 for each ratchet gear 18 has been retracted or adjusted inwardly and thereby has been disengaged from one of the longitudinally spaced openings 16 in the adjacent main channel B. As shown, the horizontal leg 42 of the L-shaped bracket is rigidly secured to and projects laterally from the outer side wall 12 of the adjustable channel, while the upright leg 43 of the L-shaped bracket is upon the inner side of and substantially parallel to the pawl 24.

Each adjustable channel C is also provided with means, preferably in the form of a fixed shoe 44, under which the tie-down chain H may be extended to enable the tie-down chain to be connected to the frame J of a motor vehicle and to enable the stub shaft 19 for the ratchet gear 18 to be operated by the crank mentioned when a ground-engaging wheel D of said motor vehicle located beside the adjustable channel C, as in FIGURE 10 of the drawings, would otherwise constitute an obstruction. As shown, this shoe 44 spans the space between and is terminally secured to opposite side walls 12 of each adjustable channel C adjacent their upper edges in longitudinally spaced relation to the pawl 24. Preferably, this shoe 44 is substantially U-shaped in cross section and has the rounded base of the U at the bottom thereof in vertically spaced relation to the bottom of the adjustable channel C to enable the tie-down chain H to be extended beneath the shoe.

Figure 16:
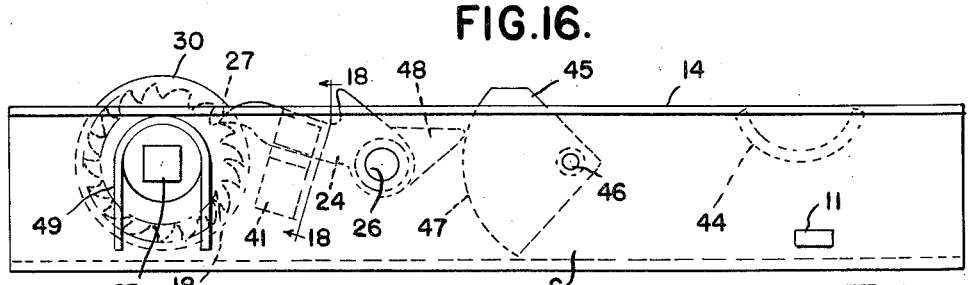
FIGURE 16 is a side elevational view of the structure shown in FIGURE 15.

If desired, each adjustable channel C may be provided with a manually operated element 45, as shown in FIGURES 15 and 16 of the drawings, for locking each pawl 24 in operative position relative to the ratchet gear 18 to thereby prevent such pawl from becoming accidentally disengaged from said ratchet gear. Preferably, this element 45 is in the form of a segment and is pivotally mounted on a headed pivot pin or rivet 46 carried by the outer side wall 12 of the adjustable channel C, so that the curved edge 47 thereof is engageable with a radially extending arm 48 integral with the hub 25 of the pawl 24 to prevent the latter from turning about its pivot pin 26.

If desired, inverted substantially U-shaped straps 49 may be employed as bearings for the stub shafts 19. As shown, these straps 49 are upon opposite side walls 12 of the adjustable channel C and are rigidly secured thereto and to the laterally projecting flanges 14 thereof.

In use, the motor vehicles to be transported are driven onto the deck A of the transport vehicle to be supported in tandem thereon. Depending upon the location of the adjustable channels C relative to the ground-engaging wheels D of the motor vehicles after the latter are in loaded position, the respective adjustable channels C may be moved lengthwise of the main channels B to positions in spaced relation to said ground-engaging wheels D, as shown in FIGURE 9 of the drawings, to enable the tie-down chains H to be extended upwardly at the proper angles from the stub shafts 19 for tie-down purposes. The respective stub shafts 19 in the adjustable channels C are then slid outwardly into engagement with selected openings 16 in the outer side walls 15 of the main channels B to lock the adjustable channels C thereto. The respective hooks 20 at the free ends of the tie-down chains H are then connected to the frames J of the motor vehicles, suitable holes being previously provided in such frames for receiving the hooks. The respective stub shafts 19 are then rotated by the cranks (not shown) to tighten or tension the tie-down chains H to tie down the motor vehicles and thereby place the spring suspension means thereof under compression. The respective pawls 24 are then moved into operative engagement with selected teeth 28 of the ratchet gears 18 to hold the tie-down chains H in tightened condition to thereby hold the motor vehicles against displacement. The respective segments 45 may then be moved into locking engagement with the arms 48 of the pawls 24 to hold the latter in operative position with the ratchet gears 18.

In the event the ratchet gears 18 are provided with flanges 30, the pawls 24 will be disposed between such flanges 30 and the brackets 41 and thus will prevent the stub shafts 19 from becoming accidentally disengaged from the selected openings 16 in the main channels B. In this connection, it will be noted by reference to FIGURE 11 that the tie-down chains H may extend at various angles inwardly, outwardly or vertically relative to the adjustable channels C depending upon the width of the motor vehicles, i.e. the location of the frame members thereof in a transverse direction relative to the adjustable channels C.

In the event the spring actuated plungers 31 are employed instead of the flanges 30 on the ratchet gears 18 to hold the stub shafts 19 in the selected openings 16 in the outer side walls 15 of the main channels B to thereby retain the adjustable channels C in locked position relative to the main channels B, then such plungers 31 will be moved automatically by their springs 38 into the space between the inner side walls 32 of the main channels B and the adjacent ends of the stub shafts 19, as soon as the latter have been slid into engagement with the selected openings 16 aforesaid, and will hold the stub shafts 19 against accidental displacement from said selected openings 16.

In the event a ground-engaging wheel D of a motor vehicle loaded on the deck A is in a position to obstruct the rotation of a stub shaft 19 by the crank mentioned, then the adjustable channel C carrying such stub shaft 19 may be moved lengthwise of its supporting main channel B to a position, as shown in FIGURE 10 of the drawings, where the shoe 44 is beside the ground-engaging wheel D and the stub shaft 19 is clear of such ground-engaging wheel. Then the tie-down chain H may be extended under the shoe 44 and thence upwardly at the proper angle to be connected by the hook 20 at the free end thereof to the frame J of the motor vehicle. The stub shaft 19 may then be engaged and rotated by the crank aforesaid to tighten or tension the connected tie-down chain H.

Figure 18:
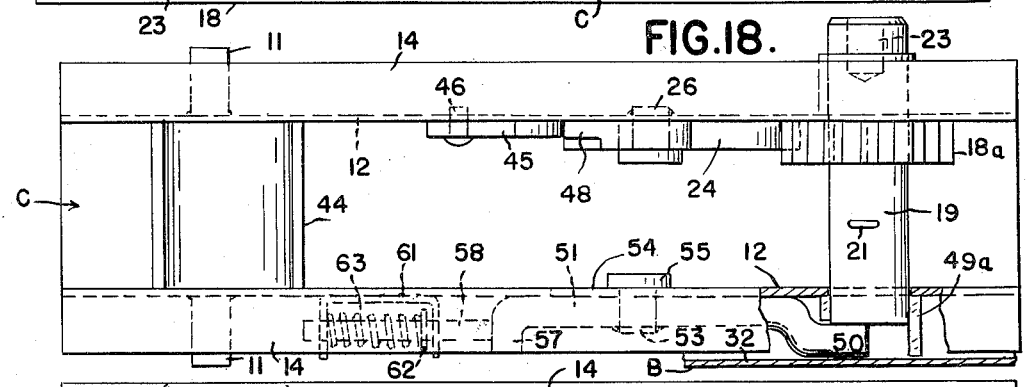
FIGURE 18 is a top plan view of another modified tie-down structure.
Figure 19:
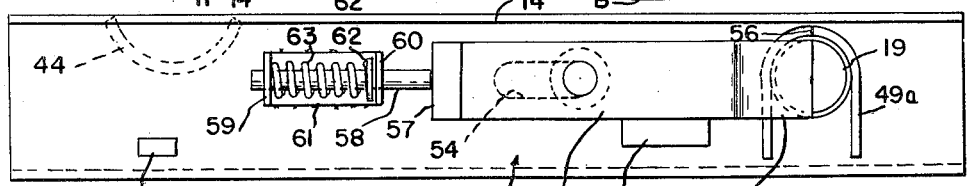
FIGURE 19 is a side elevational view of the structure illustrated in FIGURE 18.

In FIGURES 18 and 19 I have illustrated a modified tie-down structure wherein both the flange 30 and the bracket 41 have been omitted entirely, and a different structure is employed to hold a stub shaft 19 against accidental displacement when interlocked with a selected opening 16 in a main channel B. In this modification, the ratchet gear 18a is fixed to a stub shaft 19 mounted for both rotary and longitudinal movements in an adjustable channel C. A manually operable pawl 24 pivotally mounted upon the headed pivot pin or rivet 26 carried by the outer side wall 12 of the adjustable channel C may be engaged with one of the teeth of such ratchet gear 18a to hold the latter and its supporting stub shaft 19 against rotation when the tie-down chain H has been tightened.

The stub shaft 19 is adapted to be held in interlocked engagement with a selected opening 16 in a main channel B by an offset end portion 50 of a plunger 51 slidably mounted upon the outer side of the inner side wall 12 of the adjustable channel C. A guide block 52 is employed to guide the plunger 51 during sliding movement thereof. As shown, this guide block 52 is fixed to the outer side of the inner side wall 12 of the adjustable channel C at a point immediately below the plunger 51 and serves as a bearing therefor. A headed pin 53 is fixed to the plunger 51 and engages an elongated horizontally extending slot 54 in the inner side wall 12 of the adjustable channel C. The head 55 of this pin 53 is accessible at the inner side of the adjustable channel C and serves as a finger piece by which the plunger 51 may be manipulated.

The offset end portion 50 of the plunger 51 is adapted to overlie and engage the adjacent inner end of the stub shaft 19, and the thickness of said offset end portion 50 is substantially equal to the space between the adjacent inner side wall 32 of the main channel B and the adjacent inner end of the stub shaft 19 when the latter is in its outermost locked position within one of the longitudinally spaced openings 16 in the outer side wall 15 of the main channel B. Thus the offset end portion 50 of the plunger 51 will serve as a filler for the space between the inner side wall 32 of the main channel B and the adjacent end of the stub shaft 19 and will effectively prevent any accidental endwise movement of the stub shaft 19 from a selected opening 16 in an outer side wall 15 of the main channel B toward the inner side wall 32 thereof.

In the present instance, approximately one-half of an adjacent U-shaped strap 49a is cut away to provide a recess 56 to receive the offset end portion 50 of the plunger 51 and thereby permit said offset portion 50 to move into the path of the adjacent end of the stub shaft 19 and serve as an abutment or stop for the latter.

The plunger 51 is provided at its other end with an arm 57 that is bent at substantially right angles to the plunger and that engages the adjacent end of a spring pressed pin 58 slidably mounted in the parallel arms 59 and 60 respectively of a substantially U-shaped bracket 61 fixed to the outer side of the inner side wall 12 of the adjustable channel C. As shown, the pin 58 is provided between the arms 59 and 60 of the bracket 61 with a flange 62, and a coil spring 63 is sleeved upon the pin 58 between said flange 62 and the remote arm 59 of the bracket 61. Thus the spring pressed pin 58 exerts a force against the plunger 51 sufficient to maintain the offset end portion 50 in engagement with the adjacent end of the stub shaft 19. If desired, the pin 58 may be rigidly secured to or formed integral with the arm 57 of the plunger 51 instead of being formed separately therefrom.

In use, the plunger 51 will be moved automatically by the spring 63 into the space between the inner side wall 32 of the main channel B and the adjacent end of the stub shaft 19 as soon as the latter has been slid into engagement with a selected opening 16 in the main channel B and will hold the stub shaft 19 against accidental displacement from said selected opening 16. Such plunger 51 may be retracted against the tension of the spring 63 to cause the offset end portion 50 to be withdrawn from the adjacent end of the stub shaft 19 when it is desired to retract the latter from a selected opening 16 in the main channel B and thereby permit the adjustable channel C to be slid lengthwise of its supporting main channel B from one position to another.

What I claim as my invention is:

1. The combination with a longitudinally extending elongated deck of a transport vehicle, of means for tying down and holding motor vehicles arranged in tandem lengthwise of said deck, including a rail secured to and extending lengthwise of said deck, said rail being provided with a plurality of longitudinally spaced openings, carriages carried by and adjustable lengthwise of said rail, a rotatable stub shaft extending transversely of each carriage, each stub shaft being movable transversely of each carriage to engage a selected opening in said rail to hold such carriage in adjusted position, and means for tying down and holding a motor vehicle after each carriage has been held in adjusted position, including a flexible element connected to each stub shaft and to a part of a motor vehicle and adapted to be wound on such stub shaft and tensioned thereby during rotation thereof.

2. The structure defined in claim 1 wherein the flexible element is provided at one end with means by which it is connected to a frame of a motor vehicle and is secured at its other end to such stub shaft to be wound thereon and tensioned thereby during rotation thereof.

3. The structure defined in claim 1, wherein a ratchet gear is provided on each stub shaft, and a pawl is pivotally mounted on each carriage and is engageable with a selected tooth of said ratchet gear to hold the latter against rotation after said flexible element has been attached to a motor vehicle and has been tensioned.

4. The structure defined in claim 1, wherein said rail and said carriages are channel-shaped, the channel-shaped carriages are within and slidable lengthwise of said channel-shaped rail, and said channel-shaped rail and channel-shaped carriages are provided with cooperating means to prevent upward displacement of said channel-shaped carriages relative to said channel-shaped rail.

5. The structure defined in claim 4, wherein the channel-shaped carriages are provided with projections operable during sliding movement thereof to guide said carriages relative to said channel-shaped rail.

6. The structure defined in claim 4, wherein the cooperating means comprises overlapping flanges respectively carried by said rail and carriages.

7. The structure defined in claim 3, wherein means is provided to hold each stub shaft against accidental displacement when interlocked with one of said spaced openings.

8. The structure defined in claim 7, wherein the holding means includes a radially extending annular flange on each ratchet gear at one side of each pawl, and a bracket on each carriage and having a portion at the other side of and serving as a brace for said pawl.

9. The structure defined in claim 7, wherein the holding means includes a plunger mounted upon each carriage and engageable with an adjacent end of said stub shaft.

10. The structure defined in claim 9, wherein the plunger is movable between a portion of said rail and an adjacent end of each stub shaft, and the thickness of said plunger is substantially equal to the space between said portion and said end when the stub shaft is interlocked with one of the spaced openings in said rail.

11. The structure defined in claim 3, wherein means is provided on each carriage for locking each pawl against accidental disengagement from a selected tooth of said ratchet gear.

12. The structure defined in claim 3, wherein means is provided on each adjustable carriage to keep the pawl from falling to an inaccessible position after it has been disengaged from the ratchet gear.

13. The structure defined in claim 7, wherein the holding means includes a manually operable plunger mounted upon each carriage and having an offset end portion engageable with an adjacent end of said stub shaft.

14. The structure defined in claim 13, wherein the offset end portion of the plunger is movable between a portion of said rail and an adjacent end of each stub shaft, spring means is operable to retain the offset end portion of each plunger in the position between the portion of said rail and the adjacent end of said stub shaft, and the plunger is provided with a finger piece by which it may be manipulated against the tension of said spring means.

15. The structure defined in claim 1, wherein each adjustable carriage is provided with means operable during adjustment thereof lengthwise of said rail to guide the adjustable carriage during movement thereof lengthwise of said rail.

16. The structure defined in claim 1, wherein the stub shaft is provided at one end thereof with an axially extending outwardly opening polygonal socket for the reception of a correspondingly shaped end of an operating crank by which such stub shaft may be rotated to cause the flexible element to be wound upon said stub shaft and thereby tensioned when it is desired to tie down a motor vehicle.

17. The combination with a longitudinally extending elongated deck of a transport vehicle, of means for tying down and holding motor vehicles arranged in tandem lengthwise of said deck, including two laterally spaced substantially parallel rails secured to and extending lengthwise of said deck, said rails being provided with a plurality of longitudinally spaced openings, carriages carried by and adjustable lengthwise of said rails, a rotatable stub shaft extending transversely of each carriage, each stub shaft being movable transversely of each carriage to engage a selected opening in one of said rails to hold such carriage in adjusted position, and means for tying down and holding a motor vehicle after each carriage has been held in adjusted position, including a flexible element connected to each stub shaft and to a part of a motor vehicle and adapted to be wound on such stub shaft and tensioned thereby during the rotation thereof.

18. The structure defined in claim 17, wherein the parallel rails extend throughout substantially the entire length of and are rigidly secured to said elongated deck and serve as reinforcements for said deck to prevent the same from bending and buckling under the load of the motor vehicles in tandem thereon and serve as guides for the motor vehicles while they are being loaded onto and unloaded from said deck.

19. The structure defined in claim 17, wherein four adjustable carriages are provided for each motor vehicle and are arranged in transversely aligned pairs at longitudinally spaced points of said rails.

References Cited in the file of this patent

UNITED STATES PATENTS

| | | |
|---|---|---|
| 1,816,897 | Fedderman et al. | Aug. 4, 1931 |
| 2,052,914 | Williams | Sept. 1, 1936 |
| 2,178,693 | McMullen | Nov. 7, 1939 |
| 2,874,992 | Erickson | Feb. 24, 1959 |